(12) United States Patent
Kurzweil

(10) Patent No.: US 7,098,917 B2
(45) Date of Patent: Aug. 29, 2006

(54) GENERATING VISUAL ART

(75) Inventor: Raymond C. Kurzweil, Newton, MA (US)

(73) Assignee: Kurzweil CyberArt Technologies, Inc., Wellesley Hills, MA (US)

( * ) Notice: Subject to any disclaimer, the term of this patent is extended or adjusted under 35 U.S.C. 154(b) by 0 days.

(21) Appl. No.: 10/200,372

(22) Filed: Jul. 22, 2002

(65) Prior Publication Data

US 2004/0012590 A1    Jan. 22, 2004

(51) Int. Cl.
*G06T 11/20* (2006.01)
*G09G 5/00* (2006.01)

(52) U.S. Cl. ............... 345/441; 345/442; 345/443; 345/660

(58) Field of Classification Search .......... 345/441–43, 345/581, 418–20, 648, 649, 660, 672, 420
See application file for complete search history.

(56) References Cited

U.S. PATENT DOCUMENTS

| 4,694,607 A | * | 9/1987 | Ishida et al. | 49/25 |
| 4,941,193 A | * | 7/1990 | Barnsley et al. | 345/648 |
| 5,355,318 A | * | 10/1994 | Dionnet et al. | 345/419 |
| 5,416,848 A | * | 5/1995 | Young | 345/441 |
| 5,805,172 A | * | 9/1998 | Brown | 345/442 |
| 5,831,633 A | * | 11/1998 | Van Roy | 345/441 |
| 5,982,386 A | * | 11/1999 | Fujimoto | 345/443 |
| 6,473,081 B1 | * | 10/2002 | Silva et al. | 345/420 |
| 6,642,929 B1 | * | 11/2003 | Essafi et al. | 345/581 |
| 2002/0047842 A1 | * | 4/2002 | Oka | 345/441 |

* cited by examiner

*Primary Examiner*—Kee M. Tung
*Assistant Examiner*—Chante Harrison
(74) *Attorney, Agent, or Firm*—Fish & Richardson P.C.

(57) ABSTRACT

A method of generating visual art includes providing a fractal object, which includes an initiator element, a set of generator elements and a set of parameters. The set of parameters are used to render a representation of the fractal object. The generator elements follow a rule. The method also includes replacing the initiator element with the set of generator elements by scaling and orientating the set of generator elements based on the initiator element. The method further includes replacing the generator element with the set of generator elements so that the set of generator elements replacing a generator element is oriented and scaled based on the generator element being replaced. The method includes iteratively replacing generator elements with the set of generator elements.

37 Claims, 11 Drawing Sheets

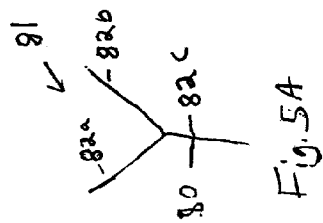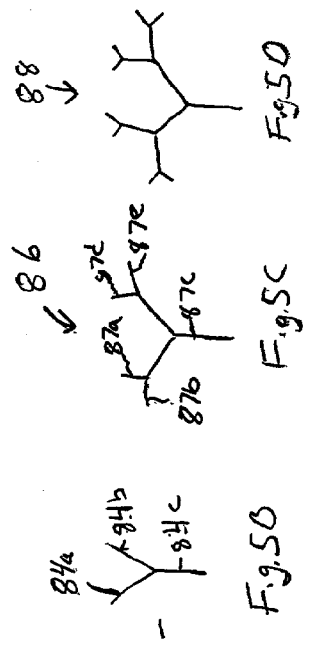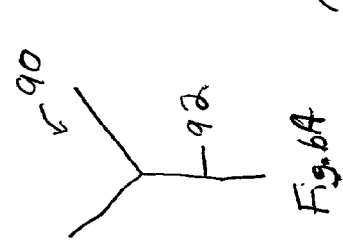

GENERATING VISUAL ART

BACKGROUND

This invention relates to generating visual art.

Through the ages, art generation typically included an artist, a paint set, a paintbrush and a canvas. The artist would brush the paintbrush with paint onto the canvas copying what the artist was actually observing or what the artist visualized. Recent developments in computers and graphical software allow an artist to generate images with a mouse by moving a cursor across a screen and performing a series of point-and-click actions. Some art has been generated using fractals. Some fractals are based on mathematical equations.

SUMMARY

In one aspect, the invention is a method of generating visual art. The method includes providing a fractal object, which includes an initiator element, a set of generator elements and a set of parameters. The set of parameters are used to render a representation of the fractal object. The generator elements follow a rule. The method also includes replacing the initiator element with the set of generator elements by scaling and orientating the set of generator elements based on the initiator element. The method further includes replacing the generator element with the set of generator elements so that the set of generator elements replacing a generator element is oriented and scaled based on the generator element being replaced. The method includes iteratively replacing generator elements with the set of generator elements.

In another aspect, the invention is an apparatus that include a processor and a memory, which stores executable instructions for generating art. The processor executes the executable instructions to provide a fractal object, which includes an initiator element, a set of generator elements and a set of parameters. The set of parameters are used to render a representation of the fractal object and the generator elements follow a rule. The processor also executes instructions to replace the initiator element with the set of generator elements by scaling and orientating the set of generator elements based on the initiator element. The processor further executes instructions to replace the generator elements with the set of generator elements so that the set of generator elements replacing a generator element is oriented and scaled based on the generator element being replaced. The processor also executes instructions to iteratively replace generator elements with the set of generator elements.

In still another aspect, the invention is an article including a machine-readable medium that stores executable instructions for generating art. The instructions cause a machine to provide a fractal object, which includes an initiator element, a set of generator elements and a set of parameters. The set of parameters are used to render a representation of the fractal object. The generator elements follow a rule. The instructions cause a machine to replace the initiator element with the set of generator elements by scaling and orientating the set of generator elements based on the initiator element. The instructions cause a machine to further replace each generator element with the set of generator elements so that the set of generator elements replacing a generator element is oriented and scaled based on the generator element being replaced. The instructions cause a machine to iteratively replace generator elements with the set of generator elements.

Some or all of the aspects of the invention described above may have some or all of the following advantages. The invention generates original art automatically. The user can choose options as to how the art is generated. The user can also edit objects using a graphical user interface. The art can be depicted in two-dimensions or three-dimensions. The art can be used to uniquely to form a variety of objects including human faces and parts of nature.

DESCRIPTION OF THE DRAWINGS

FIGS. 5A–5D are a sequence of actions for generating fractals objects when an initiator element is a generator element.

FIGS. 6A–6D are a sequence of actions for generating fractals objects having a probability less than 1 of having generator elements replaced.

DESCRIPTION

Figure 1:
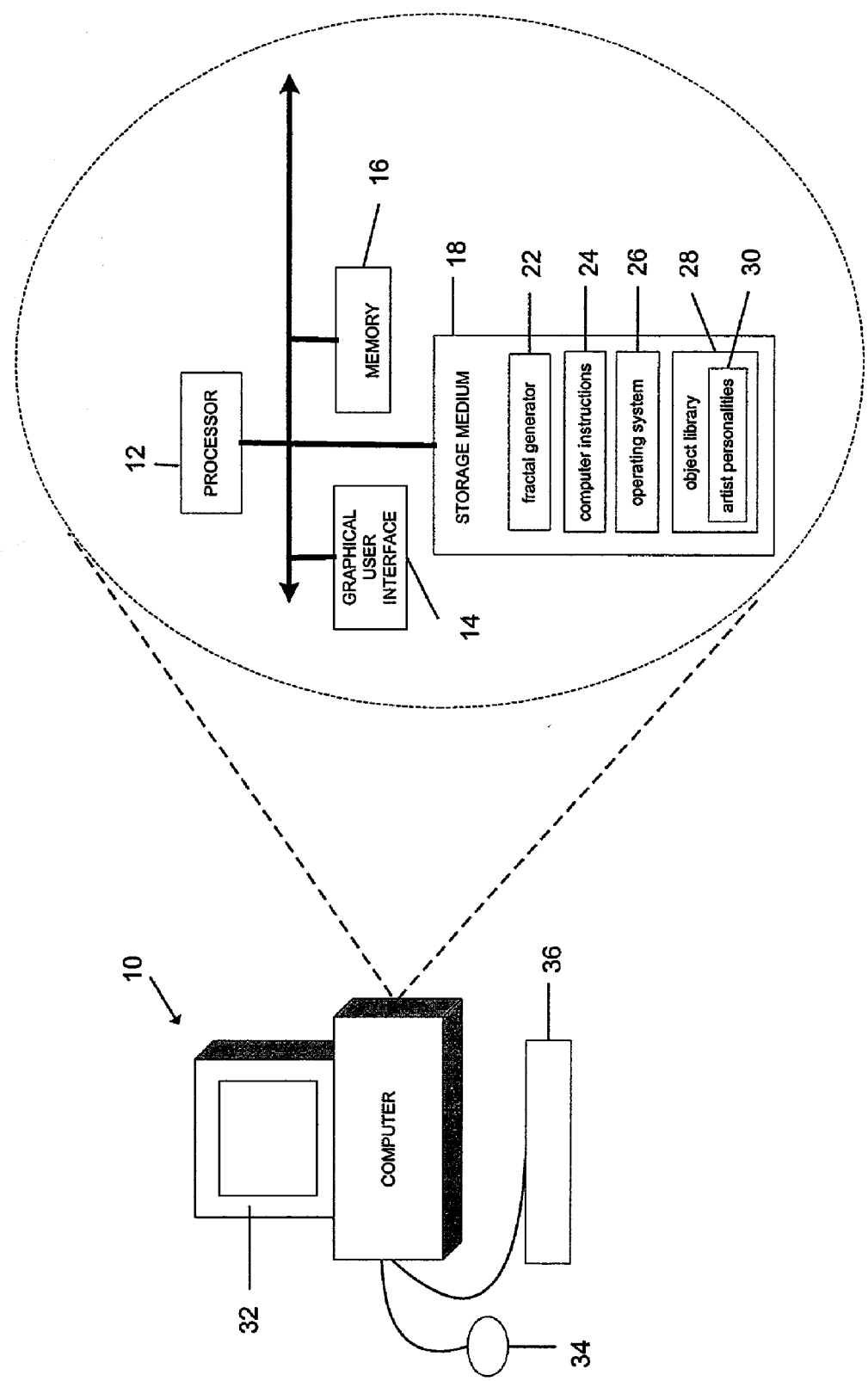
FIG. 1 is a block diagram of an art generator system.
Figure 2B:
FIGS. 2A–2D are a sequence of actions to generate fractal objects.
Figure 2D:
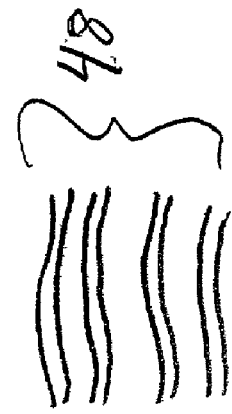
Figure 2A:
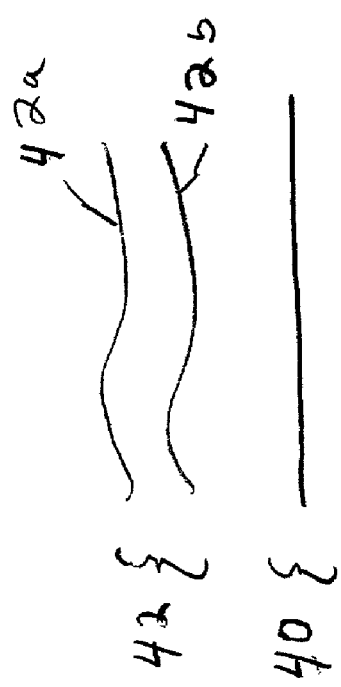
Figure 2C:
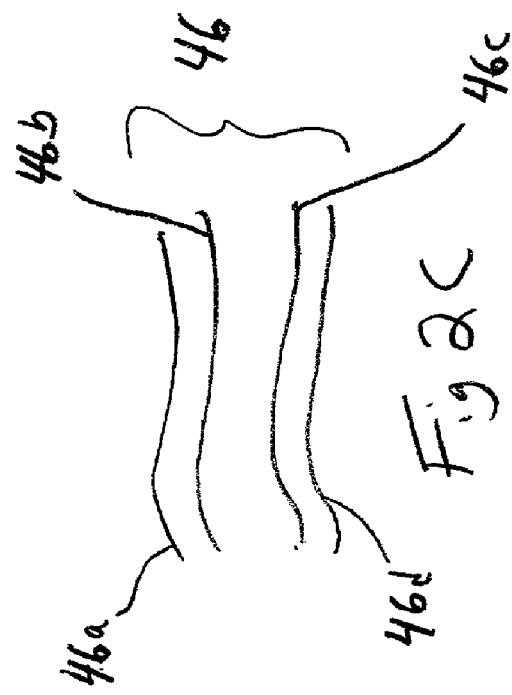

Referring to FIG. 1, an art generation system 10 automatically (without user intervention) generates visual art and assists a user in generating visual art. System 10 generates visual art through the generation of fractal objects. As will be described below, system 10 uses the fractal objects as building blocks to generate visual art. System 10 includes a processor 12, a graphical user interface (GUI) 14, a memory 16 and a storage medium 18 (e.g., a hard disk). Storage medium 18 stores a fractal generator 22 for generating the fractal objects, a set of computer instructions 24, an operating system 26 and an object library 28 storing the fractal objects and a set of artist personalities 30. The artist personalities are represented as a set of computer executable instructions. The set of computer instructions 24 is executed by processor 12 retrieved from memory 16 to generate art on a display 32. Processor 12 executes instructions based on input data received thru GUI 14 from a user (not shown) through an input/output (I/O) device or, in an automatic mode from randomly generated inputs. The I/O device is a mouse 34, a keyboard 36 or both.

System 10 has an object-oriented architecture. The fractal objects used by system 10 have their basis in conventional fractals. A conventional fractal is an iterative application of a fractal generator. The fractal generator has a number of connected lines in which the starting point of the first connected line and the end point of the last connected line are the same as the start point and the end point of the line replaced by the fractal generator.

Fractal objects are more complex than conventional fractal and fractal objects can be stored and reused. In system 10, fractal objects expand upon the conventional fractal concept in several ways. Rather than having a set of lines, the fractal generator in the system 10 has a number of fractal objects. Just like a line, the fractal object using system 10 has a start point and end point. Thus, the concept of "line" is replaced in each case with the concept of "object." An object may be a line, but it may be a much more complex entity. The objects in a fractal generator do not need to be connected although a default of system 10 is to use connected objects.

Referring to FIGS. 2A–2D, in an initial generation of a fractal replacement, an initial line or an initiator 40, is replaced with a fractal generator 42 to form a fractal object 44, which in each case is scaled and oriented to correspond with the line it is replacing. Fractal object 44 is a first generation fractal object. A second-generation fractal object 46 is generated by replacing each initiator line 44a and 44b with fractal generator 42. A third generation fractal object 48 is generated when each initiator line 46a–46d of fractal object 46 is replaced by fractal generator 42. The number of generations of fractal replacement can be fixed or selected randomly from a range.

In a determinate fractal, every line is always replaced with every component, e.g., line, circle or other geometric shape, of the fractal generator. That is, the probability that each line is replaced with the fractal generator is equal to 1. In an indeterminate fractal, the probability that each line is replaced with the fractal generator is less than 1. Alternatively, a probability may be assigned to each line in the fractal generator. Determinate fractals provide interesting geometric patterns. Indeterminate fractals are potentially more useful in that they can model the inherent chaotic nature of "natural" phenomena such as landscapes, coastlines, clouds, trees, vegetation, rocks, skin, hair, and other natural surfaces and textures.

Figure 3:
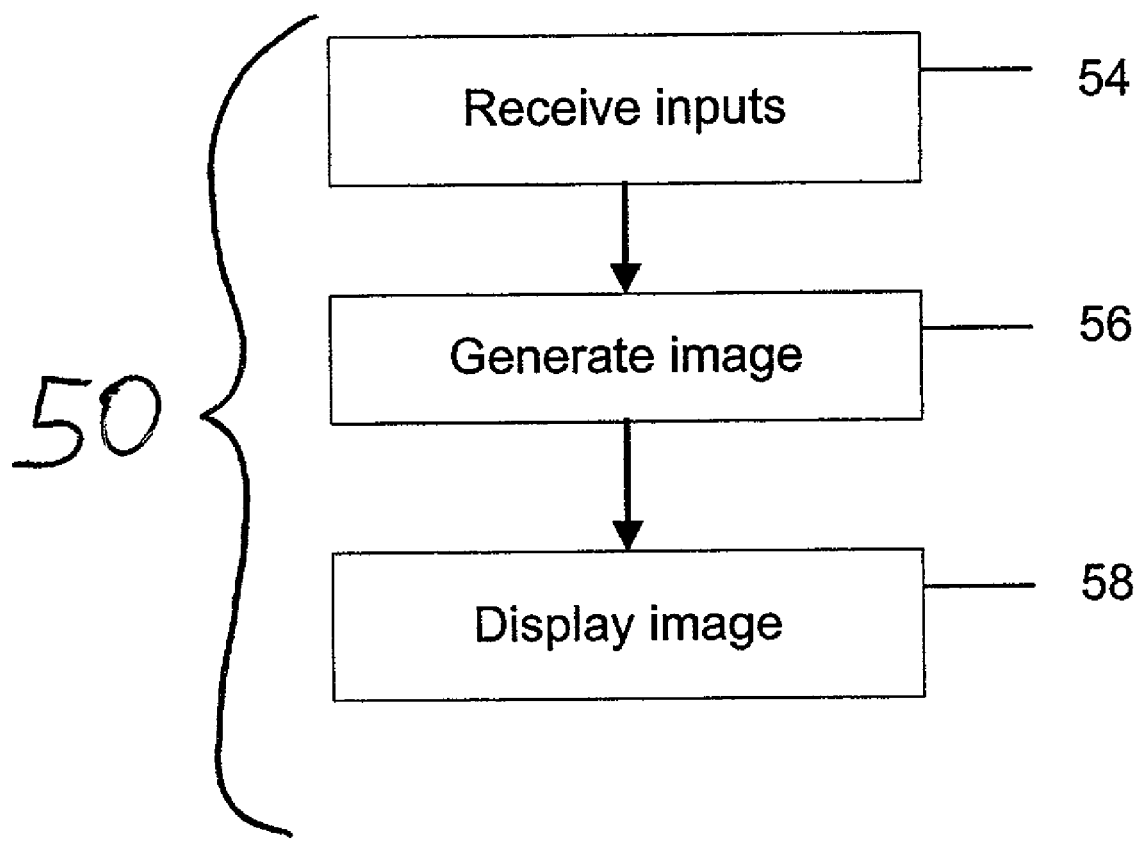
FIG. 3 is a flowchart of a process for generating art.
Figure 4:
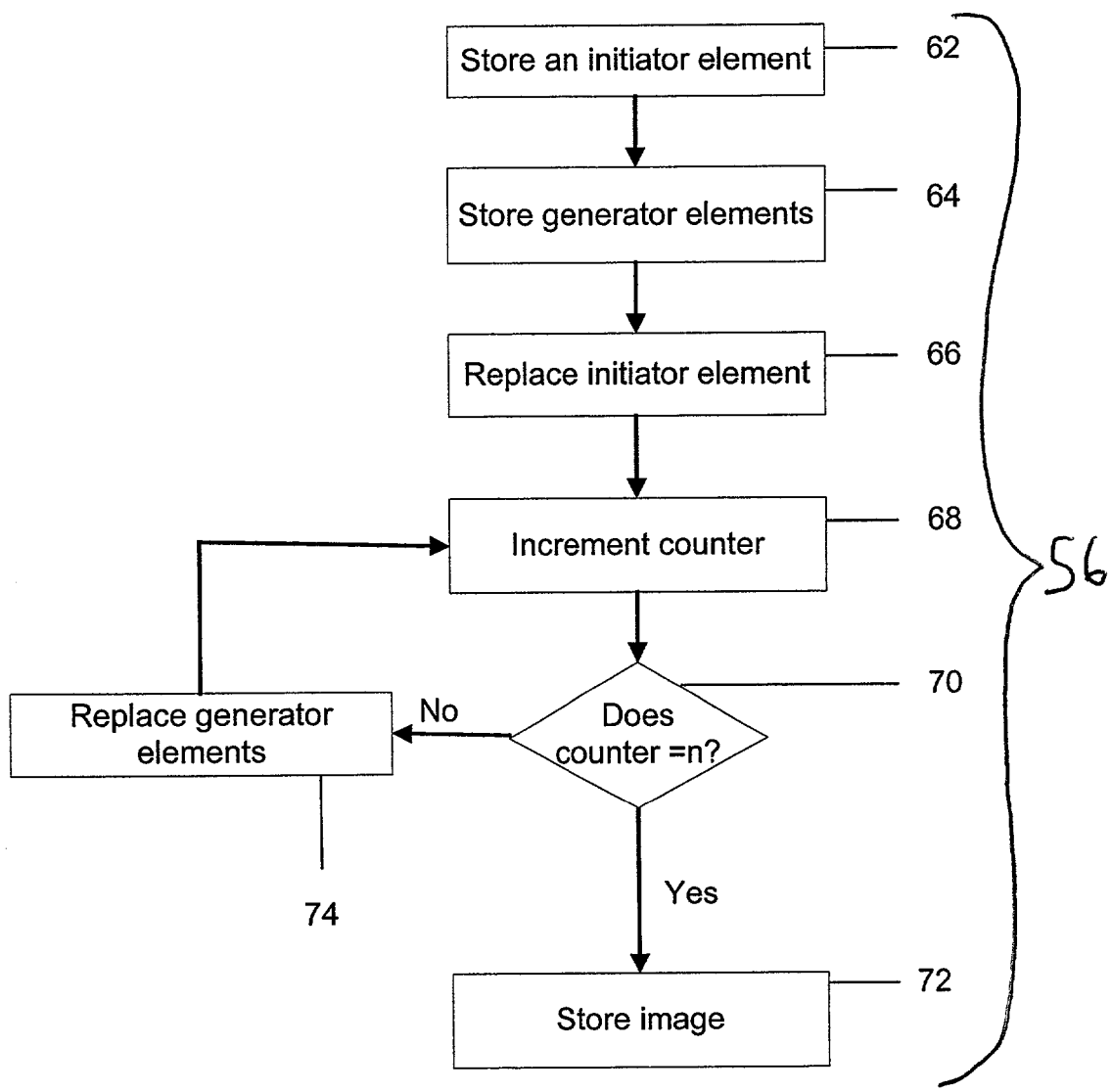
FIG. 4 is a flowchart of a process for generating an art image using a fractal generator.

Referring to FIG. 3, an exemplary implementation to generate visual art with system 10 uses a process 50. Process 50 receives (54) inputs that are either based on user inputs or from randomly generated parameters. Process 50 generates (56) images based on the inputs received.

Referring to FIGS. 4 and 5A–5D, an exemplary implementation of generating the image uses a process 56. Process 56 stores (62) an initiator element 80. Process 56 stores (64) a set of generator elements (e.g., generator element 82a, generator element 82b and generator element 82c). In this example, initiator element 80 is generator element 82c; however, that does not always have to be the case as shown in FIG. 2. Generator elements 82a–82c in aggregate are known as a fractal generator 81. Process 56 replaces (66) initiator element 80 with fractal generator 81 to form an image element 83. Image element 83 is a first generation fractal that has generator elements (e.g., generator element 84a, generator element 84b and generator element 84c). Process 56 increments (68) a counter by one. The counter records the amount of generations. Process 56 determines (70) if the counter equals the number of generations, n, requested by the user or the specified amount randomly chosen by system 10. If the counter value does equal the number of generations, n, process 56 stores (72) an image 22 produced by the process. If not, process 56 replaces (74) each generator element 84a–84c of image element 83 with fractal generator 81 to from a second-generation image element 86 with generator elements 87a–87e. As will be explained below, each generator element 84a–84c acted as an initiator element for fractal generator 81. Process 56 increments (68) the counter by one. Process 56 iteratively replaces the generator elements for each generation of the image element with fractal generator 81 until the counter equals n. For example, a third generation image element 88 is shown in FIG. 5D after fractal generator 81 replaces generator elements 87a–87e. Again each generator element 87a–87e acts as an initiator element for fractal generator 81 to replace. Process 50 displays (58) the stored image onto display 32.

In this embodiment, the default is to have the start point of the first object in the fractal generator correspond with the start point of the object it is replacing and the end point of the last object in the fractal generator correspond with the end point of the object it is replacing. However, the user may change the default so that the start point and the endpoint of the first object and the fractal generator do not correspond.

Like conventional fractals, some objects may be determinate objects in which case the objects always look the same for a given set of input parameters (size, orientation, etc.), although their size and orientation will vary from instance to instance. Other objects are indeterminate in that each rendering will look different, but will share certain qualities. As an example, consider the following, all using indeterminate objects. A maple leaf object produces an image of a maple leaf. Each maple leaf rendered by the maple leaf object appears different, but all look like maple leaves. Another object could be a maple tree object, which uses the maple leaf object as part of its definition. Each maple tree rendered by the maple tree object would include many maple leaves, each rendered by the maple leaf object. Each maple tree is different (and not just because the leaves look different), but all nonetheless look like maple trees. A maple tree grove object could then be defined, with each maple tree grove rendered by the maple tree grove object including a set of maple trees. Another example of an indeterminate object would be an indeterminate human face object, which would use indeterminate objects representing different facial features (e.g., mouth object, nose object, eye objects, eyebrow objects); or a human figure object defined using different objects representing body parts. Many other examples are possible.

Referring to FIGS. 6A–6D, for example, a fractal generator 90 includes an initiator element 92. As described above, fractal generator 90 replaces initiator element 92 to form a first generation image 94 having generator elements 95a–95c. In the first generation image 94, each element of fractal generator 90 is used. However, during the generation of a second-generation image, not all of the image elements appear as they did in third generation element 86 (FIG. 5C). Likewise, in the generation of the third generation element 98 not all of the fractal generator elements appear as they did in fourth generation image 54 (FIG. 5D). Thus, there is a probability less than 1 that an element of fractal generator 90 would replace an image element.

In other methods of generating indeterminate objects, a user can also designate a probability less than 1 that an initiator element is replaced by the fractal generator. This has further implications as explained above in that each generator element being replaced by the fractal generator acts as an initiator element for the next generation image.

Object library 28 includes basic building elements such as, designs, surfaces, and useful objects such as body and facial parts, bodies, faces, people, plants, animals, landscape elements, landscapes, and other elements. Object library 28 may be continually expanded by contributing users, through an "object sharing" or "open object" program. Object library 28 also has built-in primitive objects. For two-dimensional objects, these include lines, arcs, and Bezier curves. For three-dimensional objects, these include certain basic three-dimensional objects such as pipes, cubes, spheres, etc.

Object library 28 is built in a hierarchical fashion. The user is provided a comprehensive library of lines, edges and surfaces with a variety of qualities. The ability to provide fractal definitions allows interesting organic building blocks. Thus, rather than always using ordinary "lines," the user is able to use fractal-based lines, edge, surfaces, that have an organic appearance, and that are always rendered somewhat differently or any fractal object. Using these fractal-based building blocks, there is a wide range of objects, such as body and facial parts, bodies, faces, people, plants, animals, landscape elements, and so on. These will range from the simple to the elaborate.

In the fully automated mode, the "painting" is one object, which is defined in terms of other objects (which in turn are defined in terms of yet other objects, etc.). Each object is defined by the user (e.g., an "object designer," an "artist personality designer") using an interactive on-screen process.

Artist Personality

Artist personalities 30 are themselves sets of rules (in which one rule from the set is selected at a time to produce an image). Each artist personality 30 rule defines the composition of the painting and the objects it will contain. The rule can specify which objects in object library 28 to use. A corps of human artist personality designers generates artist personalities that emulate famous artists, such as a Picasso Cubist Painting Artist Personality, and those emulating artists such as Miro, Calder, Chagall, etc. There are also artist personalities generated that are expressions of the artist producing the personalities.

System 10 uses programmable and customizable artist personalities. One artist personality 30 may generate works that look like Picasso cubist paintings; another might generate Van Gogh-like impressionist paintings; others would have their own unique character. Artist personalities 30 are generated by human artists. Thus, artist personality 30 itself can be considered to be a new art form.

System 10 generates multiple artist personalities using a corps of (human) artist consultants. System 10, therefore, has many artist personalities, and this set of personalities can grow indefinitely. Users of system 10 are encouraged to contribute their own artist personalities (and other useful art "objects"), so the set of useful objects and personalities will grow rapidly. Users are likely to tire of just one artist personality 30 in system 10, even if a program can generate an unlimited number of pictures within that style. Artist personality is generated by a human artist using easy-to-use graphic tools that are manipulated on the screen by mouse 34. Thus, no programming is required by a user.

2D Objects

Figure 7:
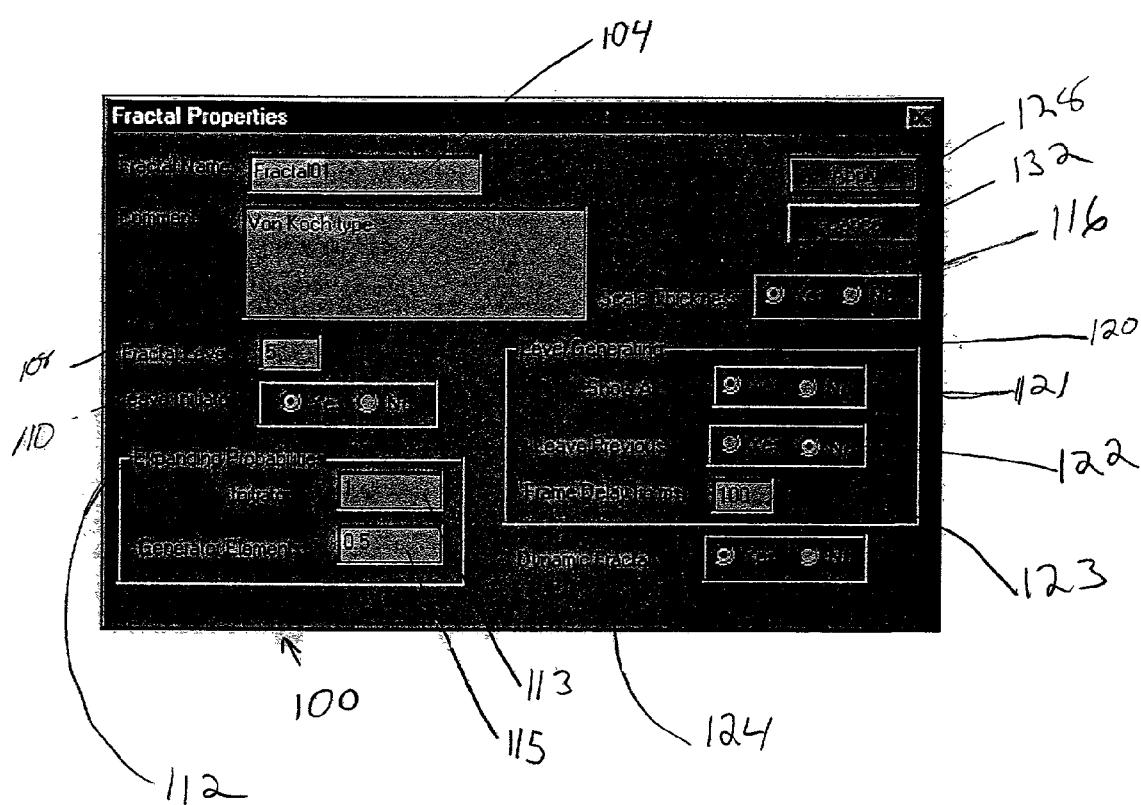
FIG. 7 is a dialog box for generating fractals.

Referring to FIG. 7, system 10 can generate and process two-dimensional (2D) objects. In 2D objects, an object is defined by the user through an interactive procedure using mouse 34 and display 32 through a fractal properties dialog box 100 in GUI 14. In fractal properties dialog box 100, the user is able to define the properties for fractal objects.

Not all fractal objects are intended to be expanded iteratively. For example, a face object may be defined to contain a fixed set of objects (e.g., one mouth, one nose, two eyes, etc.), and thus only one generation of expansion would be specified.

The core of the definition of an object is the specification of the fractal generator. The fractal generator is considered to replace another object. Every object has a start and end point. In defining a fractal generator, the start point of the object being replaced is considered to be (x=0, y=0) and the end point is considered to be (x=1, y=1) (these are double precision floating point values). The objects in the fractal generator are scaled and oriented to correspond to the actual start and end points of the object being replaced.

Fractal objects have parameters, which can affect their expansion. For example, a tube object may have a parameter called "width" which controls the width of the tube. A face object may have a parameter called "fatness" which controls the fatness of the face. Thus, each fractal object includes the initiator element, the fractal generator and a set of parameters that effect the representation of the fractal object.

Users can see examples of their object as they define it on display 32. A redo button (not shown) generates another rendering of the object.

The object definition process includes specifying a number of elements in dialog box 100 including a fractal name field 104, comments field 108, fractal level field 108, leave initiator field 110, an expanding probabilities field 112, a scale thickness 116, a level generating 120 and a dynamic fractal 124. Fractal name field 104 defines the name of the fractal file that will store the parameters of the fractal object. Comments field 104 allows the user to input any word description that characterizes the fractal object. Fractal Level field 108 specifies how many levels or n generations. Leave initiator field is a "yes" or "no" choice on whether to leave the initiator element in the final image.

Expanding probabilities field 112 includes an initiator probability field 113 and a generator element probability field 115. Each of the probabilities is on a scale from 0 to 1.

Figure 8A:
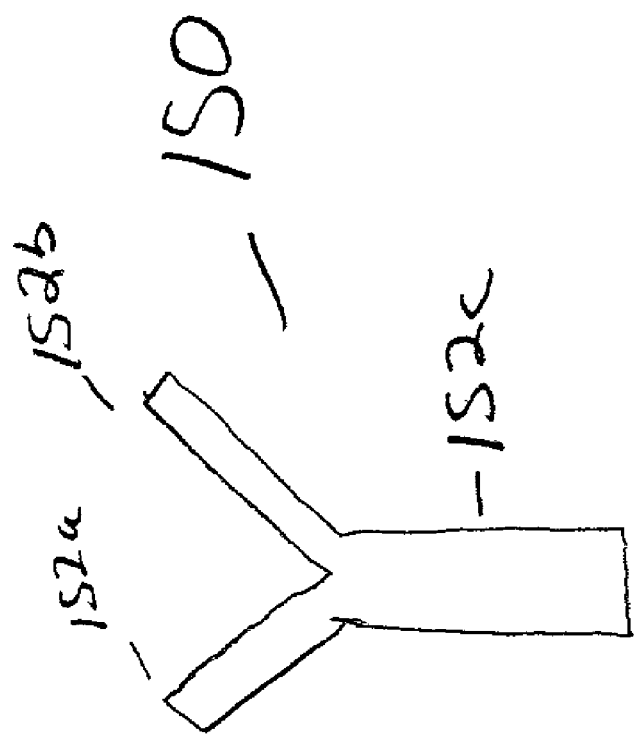
FIG. 8A is a fractal generator.
Figure 8B:
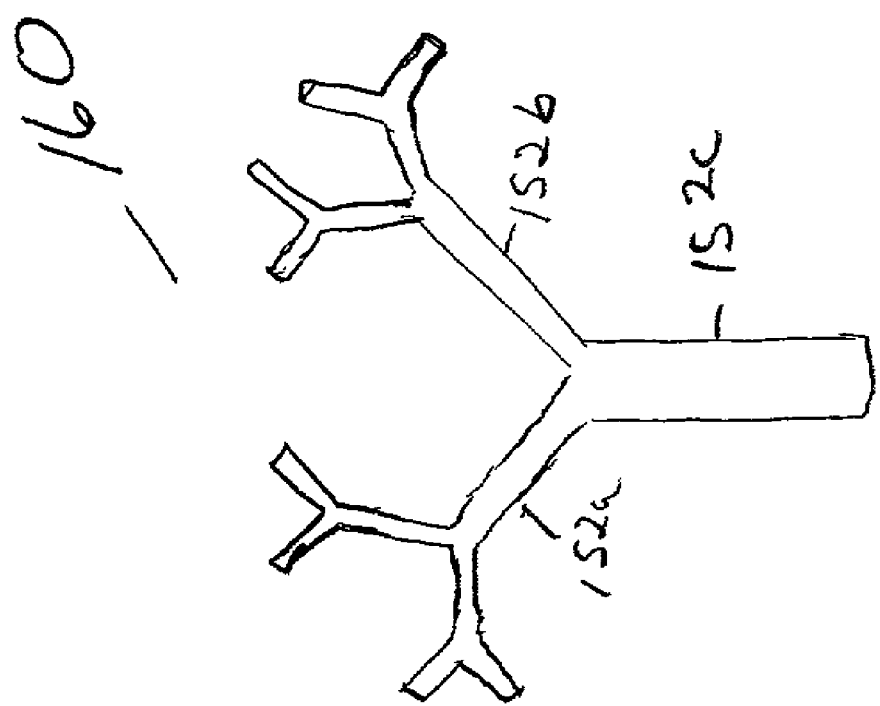
FIG. 8B is a third generation fractal object using the fractal generator of FIG. 8A.

Referring to FIGS. 8A–8B, scale thickness field 116 is a "yes" or "no" choice on whether to scale the thickness with each generation. System 10 can scale objects after each iteration in different ways. For example, suppose a generator 150 has generator elements 152a–152c elements and generator element 152c is the initiator element. Consider fractal generator 150 as a tree with a trunk 152c and two branches (152a–152b). A third generation fractal 160 would look like a tree with branches that are scaled smaller with each fractal generation. One scaling method is to make subsequent generations a function of a cross-sectional area of previous generations. For example, the summation of each cross-sectional area of each branch equals the cross-sectional area of the trunk 152c. Even though the third generational fractal 160 is based on a cross-sectional area requiring a third dimensional parameter, system 10 can still be translate into two dimensions because the thickness of each branch is twice the radius. Other scaling can be based on any geometric or algebraic equation.

Level Generating field 120 includes a "show all" field 121, a "leave previous" field 122 and a frame delay field 123. "Show all" field 121 is a "yes" or "no" choice on whether to show all the generations of images being generated. "leave previous" field 122 is a "yes" or "no" choice on whether to leave the previous generations of images. Frame delay field 123 allows the user to input the amount of time delay between each generation of image. Dynamic fractal field 124 is a "yes" or "no" choice on whether to generate objects that expand differently every time they are initiated by the user or system 10. Level Generating field 120 and dynamic field 124 are particularly useful in generating motion in objects. Level Generating field 120 and dynamic field 124 are particularly useful in generating motion in objects. The parameters above are applied to software to render the image in system 10 by engaging an "Apply" button 128 with mouse 32. A user can cancel the changes made to the fractal properties by engaging a "Cancel" button 132 with mouse 32.

Other parameters that could be designated are the minimum and maximum number of generations of iterative expansion (with this min and max expressed as a formula using elements as specified below for point coordinates).

In other embodiments, a different definition for the last generation of expansion is allowed. This allows, for example, a tree to be generated as a fractal expansion of tree limbs, with leaves provided at the end of the terminal branches.

The number of objects in the fractal generator can also be specified. In addition there are a number of ways to specify the start and end point of an object. There are four options: absolute coordinates, relative coordinates, a formula and two-dimensional regions specified by formulas. Note that of the four options below, each is a generalization of the previous options. Thus, the last option, two-dimensional regions specified by formula, covers all of the previous options. Nonetheless, the user is given these four choices, and is guided interactively through the specifications required for each choice.

For the first option using absolute coordinates, the start and end points of the object being replaced are (0, 0) and (1, 1) respectively. For the second option, relative coordinates, the coordinates are relative to the start and end points of other earlier objects in this fractal generator. For example, the second object in the fractal generator can specify its start point and/or end point relative to the start point and/or end point of the first object in the fractal generator. Note that points may be specified in relation to other points either in terms of rectangular coordinates, or by angular coordinates.

The third option uses a formula. The formula option has a number of elements. Definitions of an object can use formulas using these elements such as: absolute coordinates, start and end points of earlier objects in this fractal generator, measurements of the object being replaced (or supplemented) by this fractal generator (such as width, depth, area), measurements of earlier objects in this fractal generator (such as width, depth, area), parameters of this object, the coordinates of the end point may be specified in terms of the coordinates of the start point, and random numbers.

In the fourth option, two-dimensional regions are specified by the formulas. A region can just be a circle, but other shapes can be added. At the time of expansion, the point is selected randomly from the two-dimensional region. Different shadings of the region can be specified. The shading specifies the likelihood of different points in the region. For example, if a circular region is specified with a shading that is darkest in the middle and which becomes lighter towards the outer edge of the circular region, then points near the center of the region are more likely to be selected than points near the edge of the region.

Other parameters that can be chosen by the user include specifying the type of object. The object is specified as one of the following: a previously defined object, a hand drawn drawing, and primitive objects. The previously defined object is specified by name and is stored in object library 28 or an object defined by the user. The hand drawn drawing requires a thickness parameter.

Certain primitive objects are provided by the system such as a line, which requires one thickness parameter; a Bezier curve, which requires one curvature parameter and one thickness parameter; and a circle arc, which requires one curvature parameter and one thickness parameter. Parameters for the object if required are specified as formulas using the same types of elements as the specification of the start and end point coordinates.

The user can also perform fractal generation using color specifications. For example, color can be selected by a user to specify a start color (chosen from the palette of all colors), a region of variation within the color circle, and a rate of variation. For example, the user can designate a color for the initiator element, a color for each generator element in the fractal generator and a color for each image generated.

Editing Fractals

Figure 9:
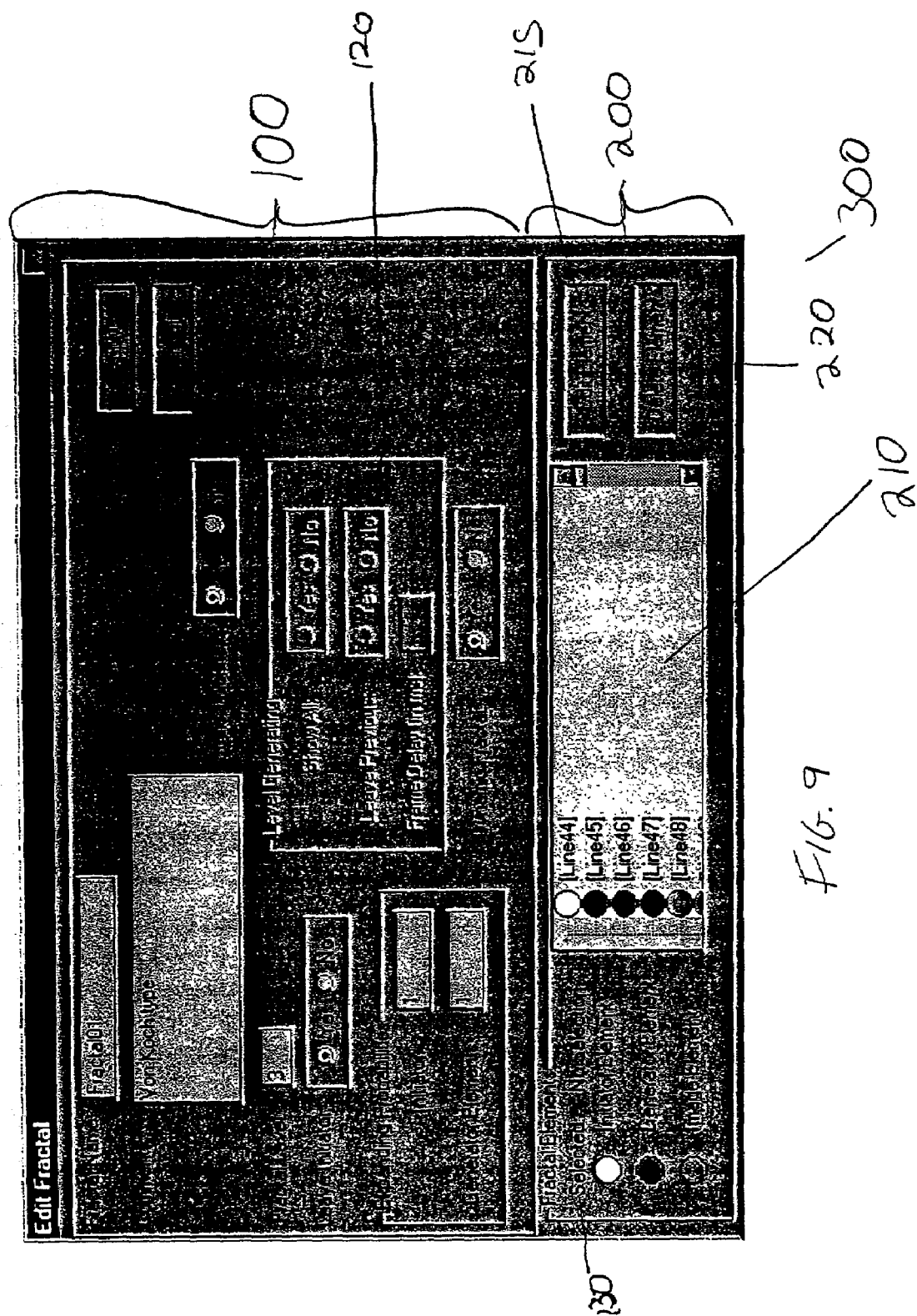
FIG. 9 is a dialog box for editing fractals.

Referring to FIG. 9, each fractal object can be modified by the user to artistically change the objects to suit an artistic goal using a dialog box 300. Dialog box 300 is made-up of dialog box 100 and a fractal elements section 200. Level generated field 120 is not accessible during an edit mode and is consequently shaded out. Fractal elements section 200 includes a line menu 210, an "edit element" button 215, a "delete element" button 220, and a selected field 230. The user selects which lines to edit from line menu 210 and engages edit element button 215 to make changes. Delete element button 220 when engaged deletes the selected line. Selected field 230 indicates the type of element chosen whether it is an initiator element, generator element, or an image element. The image element represents the fractal object after being generated.

Figure 10:
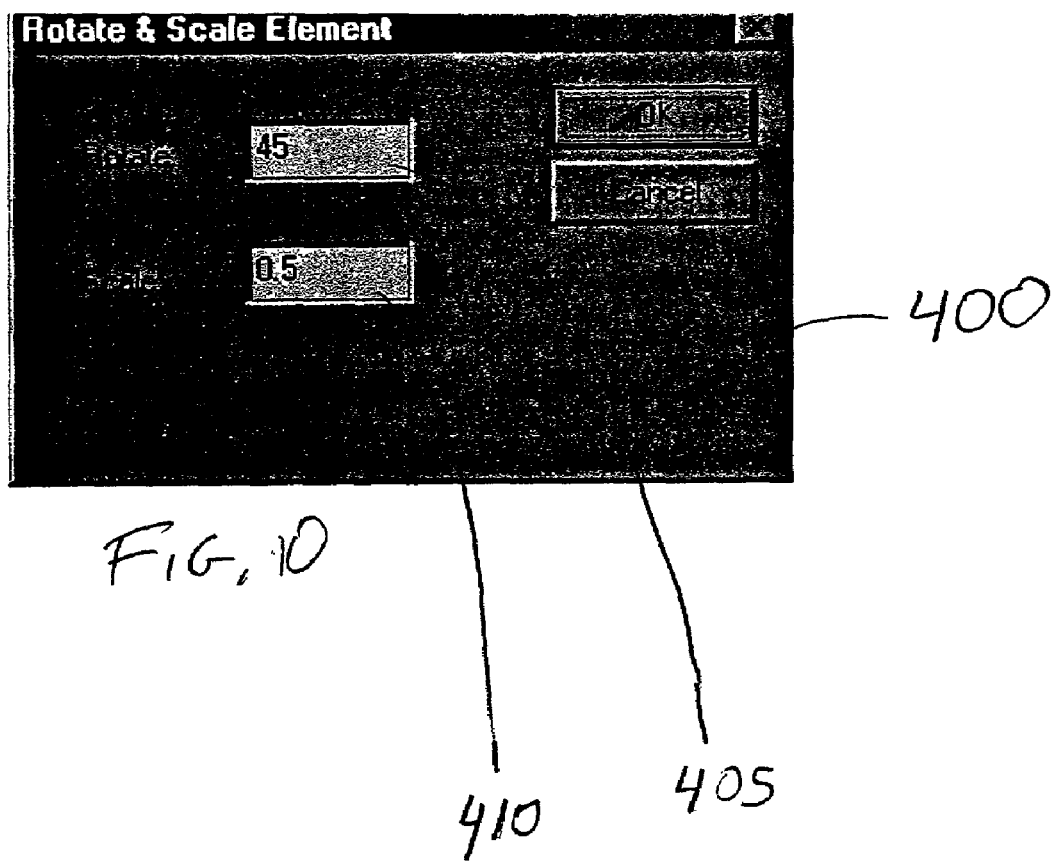
FIG. 10 is a dialog box for rotating and scaling an element.

Referring to FIG. 10, some of the changes that can be made to an element include rotation and scale. A dialog box 400 includes a rotate field 405 and a scale field 410. Rotate field 405 rotates a chosen element by the amount of degrees indicated in the field as typed in by the user. Scale field 410 scales the element by the number in the field as typed in by the user.

Re-Rendering Fractals

Figure 11:
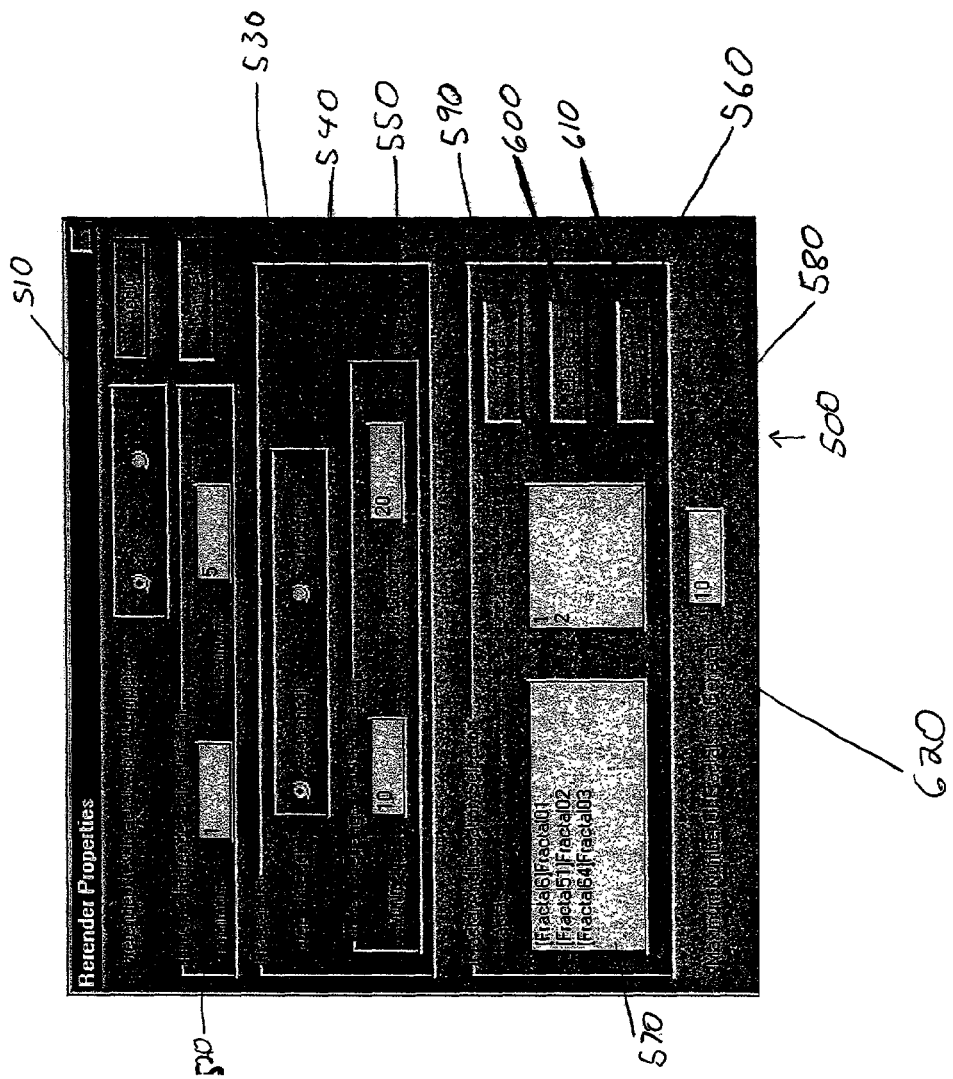
FIG. 11 is a dialog box to re-render properties of fractal objects.

Referring to FIG. 11, a re-render properties dialog box 500 allows the user to modify the rendering of a group of fractal objects. As described above a fractal object may have multiple generations. When multiple objects being used, system 10 may render each fractal object one at a time or render a generation of the objects before proceeding to the next generation. Dialog Box 500 has a "Re-render Next Fractal When Complete" field 510 which is a "yes" or "no" choice on whether to re-render the next fractal object after the previous fractal object is complete. Thus, if "no" is selected, a generation is completed for each object prior to moving to subsequent generations. A "Time to Re-render Same Fractal" field 520 allows the user to specify in milliseconds the minimum and maximum time to render an individual fractal object. A "Step Through" field 540 allows the user to specify whether the fractal objects are rendered sequentially or randomly. A sequential rendering performs the fractal generation sequentially so that the rendering moves from one fractal object to the next fractal object in the same order for each generation of rendering. The random rendering of a group of fractal objects occurs in a random order for each generation. A "Time to Change To Next Fractal" field 550 specifies the maximum and minimum time delay in milliseconds of rendering between fractal objects. A "Fractal and Location Selection" Field 560 enables the user to select from a Fractals list 570 which fractal objects to use during the re-rendering. A Locations list 580 allows the user to specify where to render the fractal objects and in what order to perform a generation. An "Add Next" button 590 adds the next fractal object to the list to Fractals List 570. A "Delete Last" button 600 deletes the last fractal object in Fractals List 570. An "Empty" button 610 clears Fractal List 570. A "Maximum Number of Fractals To Generate" Field 620 allows the user to specify how many fractal objects to generate. Controlling the re-render properties is another method for generating movement. For example, a series of tree objects can be depicted as swaying as the tree objects are generated.

3D Objects

System 10 can also be implemented to use and generate 3D objects. 3D objects are similar to 2D objects except that the object is generated in 3D space.

The object definition process interactively specifies a number of elements, similarly to the two-dimensional objects indicated above with some differences describe below.

For each such object there are options that include the start and end point of the object that include the absolute coordinates, relative coordinates, formulas, and 3D specified by formula. Of the options, each is a generalization of the previous options. Thus, the last option (3D specified by formula) covers all of the other options. Nonetheless, the user is given choices, and is guided interactively through the specifications required for each choice.

For absolute coordinates option, system 10 considers that the start and end points of the object being replaced are (0, 0, 0) and (1, 1, 1). For relative coordinates option, the coordinates are relative to the start and end points of other earlier objects in this fractal generator. For example, the second object in the fractal generator can specify its start point and/or end point relative to the start point and/or end point of the first object in the fractal generator. Points may be specified in relation to other points either in terms of rectangular coordinates, or by angular coordinates.

A formula option uses the following elements and all definitions of an object can use formulas using these elements: absolute coordinates, start and end points of earlier objects in this fractal generator, measurements of the object being replaced (or supplemented) by this fractal generator (such as width, depth, area), measurements of earlier objects in this fractal generator (such as width, depth, area), parameters of this object, coordinates of the end point are specified in terms of the coordinates of the start point, and random numbers Three-dimensional regions specified by the formula option can have a region be a sphere. In other embodiments other shapes are added. At the time of expansion, the point is selected randomly from the three-dimensional region. Different shadings of the region can be specified. The shading specifies the likelihood of different points in the region. For example, if a spherical region is specified with a shading that is darkest in the middle and which becomes lighter towards the outer edge of the spherical region, then points near the center of the region are more likely to be selected than points near the edge of the region.

The object can be specified either as a previously defined object, a hand drawn object, which require a thickness parameter, or certain primitive objects. A previously defined object is specified by name would be one of the objects from object library 28, or an object defined by the user.

A hand drawn drawing (requires a thickness parameter) is done on a plane, and the orientation of the plane is specified. In other embodiments system 10 can allow drawing on non-planar surfaces.

The certain primitive objects are provided by the system and include a line, which requires one thickness parameter; a Bezier curve, which requires one curvature parameter and one thickness parameter; a circle arc, which requires one curvature parameter and one thickness parameter; a pipe, which may have one of a variety of cross sectional shapes (circle, triangle, square, etc.). For a pipe, the user selects a type of surface, which includes the parameters of thickness and curvature. The user can also specify how the pipes are joined. Other primitive objects include basic three-dimensional objects such as rectangular solid, spherical solid, conical solid, elliptical solid, etc. The user selects a type of surface. Parameters for these include dimensions and curvature when applicable.

Other parameters for the object can be specified if required. These are specified as formulas using the same types of elements as the specification of the start and end point coordinates above.

Color of the object is specified as a start color, a region of variation within the color circle, and a rate of variation.

The 3D image is rendered onto the 2D screen by specifying the six dimensions of a viewpoint where a point in space is defined by three degrees of freedom, a direction of view is defined by two degrees of freedom, and an angle of view (telephoto to wide angle) is defined by one degree of freedom.

The viewpoint can be fixed (as is the case for a conventional fixed painting with perspective), or can move dynamically. The movement can be defined by the user in real-time, or can be automated (with user specified parameters).

Modes

System 10 may be used in a number of modes. For example, in the fully automated modes, system 10 generates each finished painting, and displays the finished painting. Thus, the user sees one painting after another. The user selects which artist personalities are active. Each artist personality is defined by either a rule, or a set of rules (one of which is selected for each "painting"). In a second example, system 10 generates finished painting, and the user then views the painting applied to the "canvas" line-by-line and color-by-color.

In a third example, the user can watch the painting evolve as it is produced. Thus, some lines and colors are applied, then removed, and replaced with other lines and colors, and so on. The human viewer thus sees the system 10 changes its "mind" and rework the artwork. This form of evolution can also produce the sense of dynamic movement, not just the reworking of each artistic element. Thus, branches could be made to sway. Thus, paintings can be given movement.

System 10 can generate three-dimensional scenes, which are rendered onto a two-dimensional surface from a viewpoint. The viewpoint can move, either by user control or automatically. This allows the user to "fly" through the three-dimensional scene producing moving two-dimensional perspectives. System 10 can fly through the three-dimensional scene as it is evolving, producing two sources of dynamic movement (the evolution of the image itself, as well as the fly-through of the evolving image).

In another mode, system 10 has an artist assistant mode that provides an extensive "palette" of automated tools to generate visual art. These tools are the set of objects used to produce fully automated works of art. In this mode, system 10 is a tool kit. The user can use this tool kit to generate a two-dimensional painting, a three-dimensional image, which can then be projected onto a two-dimensional painting, or can be flown through, dynamic evolving paintings that change over time, additional objects for the library of objects, and Artist personalities.

In other embodiments, one or more of the modes above can be incorporated in a screensaver displaying images on monitor 32.

Fractal Object Data Structure

Figure 12:
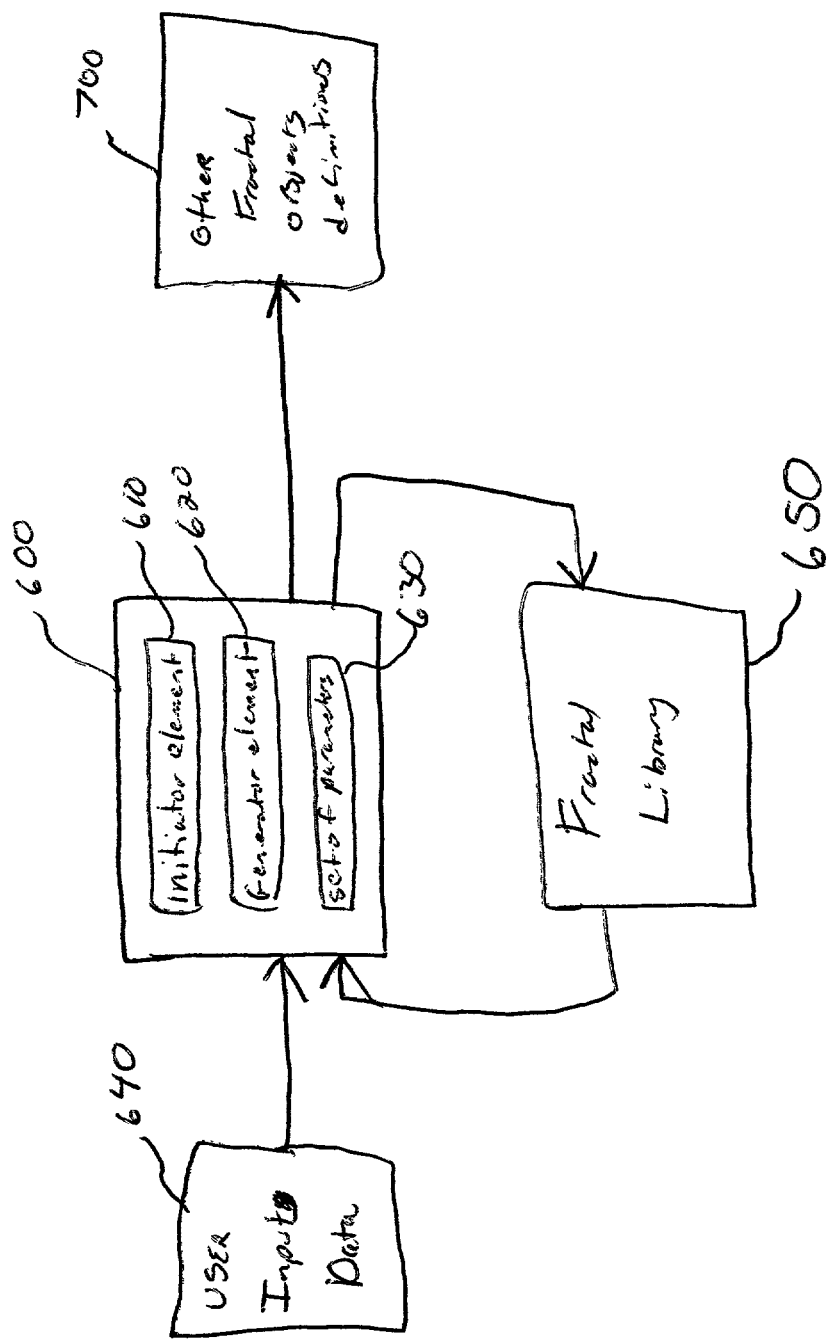
FIG. 12 is a diagram of a fractal object data structure.

Referring to FIG. 12, a data structure for a fractal object definition 600 includes an initiator element definition 610, generator elements definition 620 and a set of parameters 630, which define the fractal object expansion. Fractal object definition 600 receives inputs from user input data 640 and/or from fractal library 650. The fractal object definition outputs data to other fractal object definitions 700 to generate other fractal objects, a display 800 to observe the fractal object and/or save to a fractal library 650 for future use.

Computer

Process 50 is not limited to use with the hardware and software of FIG. 1; it may find applicability in any computing or processing environment and with any type of machine that is capable of running a computer program. Process 50 may be implemented in hardware, software, or a combination of the two. Process 50 may be implemented in computer programs executed on programmable computers/machines that each includes a processor, a storage medium/article readable by the processor (including volatile and non-volatile memory and/or storage elements), at least one input device, and one or more output devices. Program code may be applied to data entered using an input device to perform process 50 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium (article) or device (e.g., CD-ROM, hard disk, or magnetic diskette) that is readable by a general or special purpose programmable computer for configuring and operating the computer when the storage medium or device is read by the computer to perform process 50. Process 50 may also be implemented as a machine-readable storage medium, configured with a computer program, where upon execution, instructions in the computer program cause the computer to operate in accordance with process 50.

The process is not limited to the specific embodiments described herein. For example, system 10 can also be implemented using a high definition television system. The process is not limited to the specific processing order of FIGS. 3 and 4. Rather, the blocks of FIGS. 3 and 4 may be reordered, as necessary, to achieve the results set forth above.

Other embodiments are also within the scope of the following claims.

What is claimed is:

1. A method of generating visual art, the method comprising:
    providing a fractal object that includes an initiator element, a set of generator elements, comprised of fractal objects and a set of parameters, the set of parameters used to render a representation of the fractal object, with the set of parameters including a probability, $q(0 \leq q \leq 1)$ that a generator element in the set of generator elements is used to replace a generator element, and with the generator elements following rules;
    replacing the initiator element with the set of generator elements comprised of fractal objects, the set of generator elements being scaled and orientated based on the initiator element;
    replacing at least one of the generator elements with the set of generator elements comprised of fractal objects, which are oriented and scaled based on the generator element being replaced; and
    iteratively replacing generator elements with the set of generator elements comprised of fractal objects.

2. The method of claim 1 wherein the set of parameters includes a probability, $p(0 \leq p \leq 1)$, that a generator element is replaced by the set of generator elements.

3. The method of claim 2 wherein replacing the generator element with the set of generator elements comprises replacing each generator element based on the probability, p.

4. The method of claim 1 wherein the set of parameters includes a generations parameter designating the number of generations the set of generator elements replace generator elements.

5. The method of claim 4 wherein replacing generator elements with the set of generator elements comprises replacing generator elements until the number of generations equals the generations parameter.

6. The method of claim 1 wherein replacing the generator element with the set of generator elements comprises using the probability, q, that a generator element in the set of generator elements will be used to replace a generator element.

7. The method of claim 1 wherein the rules represent depicting a two-dimensional geometric shape selected from the group consisting of a line, a square, a circle, and a triangle.

8. The method of claim 1 wherein the rules represent depicting a three-dimensional geometric shape selected from the group consisting of a plane, a cube, a sphere, and a pyramid.

9. The method of claim 1 wherein the rules represent depicting another fractal object.

10. The method of claim 1, further comprising;
    using the initiator element as a generator element.

11. The method of claim 1, further comprising:
    rendering a representation of the fractal object on a display device.

12. The method of claim 11, further comprising:
    grouping fractal objects by an artistic personality.

13. The method of claim 1, further comprising:
    editing the generator element of the fractal object.

14. The method of claim 1, further comprising:
    re-rendering a group of fractal objects sequentially.

15. The method of claim 1, further comprising:
    re-rendering a group of fractal objects randomly.

16. The method of claim 1, further comprising:
    scaling subsequent fractal generator elements based on a formula and the initiator element.

17. The method of claim 1, further comprising:
    re-rendering a group of fractal objects; and
    specifying an order for rendering each fractal object and a location for each fractal object rendered.

18. The method of claim 1 wherein providing a fractal object comprises defining the initiator element.

19. The method of claim 1 wherein providing a fractal object comprises defining the generator elements.

20. An apparatus comprising:
    a memory to store executable instructions for generating visual art; and
    a processor to execute the executable instructions to:
        provide a fractal object that includes an initiator element, a set of generator elements, comprised of fractal objects and a set of parameters, the set of parameters used to render a representation of the fractal object, with the set of parameters including a probability, $q(0 \leq q \leq 1)$ that a generator element in the set of generator elements is used to replace a generator element, and with the generator elements following rules;

replace the initiator element with the set of generator elements, comprised of fractal objects the set of generator elements being scaled and orientated based on the initiator element;

replace at least one of the generator elements with the set of generator elements, comprised of fractal objects which are oriented and scaled based on the generator element being replaced; and iteratively replace generator elements with the set of generator elements.

21. The apparatus of claim 20 wherein the set of parameters includes a probability, $p(0 \leq p \leq 1)$, that a generator element is replaced by the set of generator elements.

22. The apparatus of claim 21 wherein to replace the generator element with the set of generator elements comprises replacing each generator element based on the probability, p.

23. The apparatus of claim 20 wherein the set of parameters includes a generations parameter designating the number of generations the set of generator elements replace generator elements.

24. The apparatus of claim 20 wherein to replace the generator element with the set of generator elements comprises using the probability, q, that a generator element in the set of generator elements will be used to replace a generator element.

25. The apparatus of claim 20 wherein to replace generator elements with the set of generator elements comprises replacing generator elements until the number of generations equals the generations parameter.

26. The apparatus of claim 20 wherein the rules represent depicting a two-dimensional geometric shape selected from the group consisting of a line, a square, a circle, and a bangle.

27. The apparatus of claim 20 wherein the rules represent depicting a three-dimensional geometric shape selected from the group consisting of a plane, a cube, a sphere, and a pyramid.

28. The apparatus of claim 20 wherein the wiles represent depicting another fractal object.

29. An article comprising a machine-readable medium that stores executable instructions for generating visual art, the instructions causing a machine to:

provide a fractal object that includes an initiator element, a set of generator elements, comprised of fractal objects and a set of pararmeters, the set of parameters used to render a representation of the fractal object, with the set of parameters including a probability, $q(0 \leq q \leq 1)$ that a generator element in the set of generator elements is used to replace a generator element, and with the generator elements following rules;

replace the initiator element with the set of generator elements, comprised of fractal objects, the set of generator elements being scaled and orientated based on the initiator element;

replace at least one of the generator elements with the set of generator elements, comprised of fractal objects, which are oriented and scaled based on the generator element being replaced; and iteratively replace generator elements with the set of generator elements.

30. The article of claim 29 wherein the set of parameters includes a probability, $p(0 \leq p \leq 1)$, that a generator element is replaced by the set of generator elements.

31. The article of claim 30 wherein to replace the generator element with the set of generator elements comprises replacing each generator element based on the probability, p.

32. The article of claim 29 wherein the set of parameters includes a generations parameter designating the number of generations the set of generator elements replace generator elements.

33. The article of claim 32 wherein to replace generator elements with the set of generator elements comprises replacing generator elements until the number of generations equals the generations parameter.

34. The article of claim 29 wherein to replace the generator element with the set of generator elements comprises using the probability, q, that a generator element in the set of generator elements will be used to replace a generator element.

35. The article of claim 29 wherein the rules represent depicting a two-dimensional geometric shape selected from the group consisting of a line, a square, a circle, and a triangle.

36. The article of claim 29 wherein the rules represent depicting a three-dimensional geometric shape selected from the group consisting of a plane, a cube, a sphere, and a pyramid.

37. The article of claim 29 wherein the rules represent depicting another fractal object.

* * * * *